United States Patent [19]

Bush et al.

[11] 4,079,441

[45] Mar. 14, 1978

[54] ANODE ELECTRODE FOR AN ELECTROLYTIC CAPACITOR

[75] Inventors: Eric Langley Bush, Matching Green; Denis William John Hazelden, Bishops Stortford, both of England

[73] Assignee: International Standard Electric Corporation, New York, N.Y.

[21] Appl. No.: 700,429

[22] Filed: Jun. 28, 1976

[51] Int. Cl.² ............................................. H01G 9/00
[52] U.S. Cl. .................................................. 361/433
[58] Field of Search ...................... 317/230; 29/182.5; 75/206, 212, .5 BB; 427/80; 428/403, 404, 406; 361/433

[56] References Cited

U.S. PATENT DOCUMENTS

| | | | |
|---|---|---|---|
| 3,248,612 | 4/1966 | Rogers | 317/230 |
| 3,260,576 | 7/1966 | Gruene et al. | 75/206 X |
| 3,708,728 | 1/1973 | Sterling et al. | 317/230 |

*Primary Examiner*—Stanley D. Miller, Jr.
*Assistant Examiner*—James W. Davie
*Attorney, Agent, or Firm*—John T. O'Halloran; Peter C. Van Der Sluys

[57] ABSTRACT

An electrolytic capacitor utilizes tantalum coated alumina particles as anode material to provide better breakdown properties than pure tantalum particles at a substantial savings in tantalum materials cost. The coating of valve metal having an anodized portion and an unanodized portion, the thickness of the unanodized portion not exceeding 0.5 microns.

7 Claims, 4 Drawing Figures

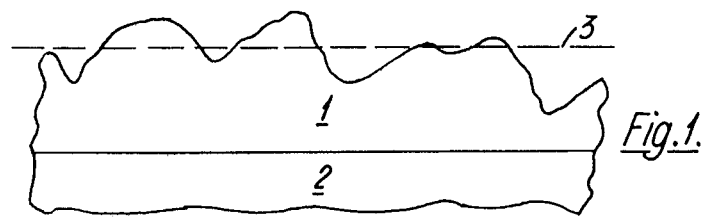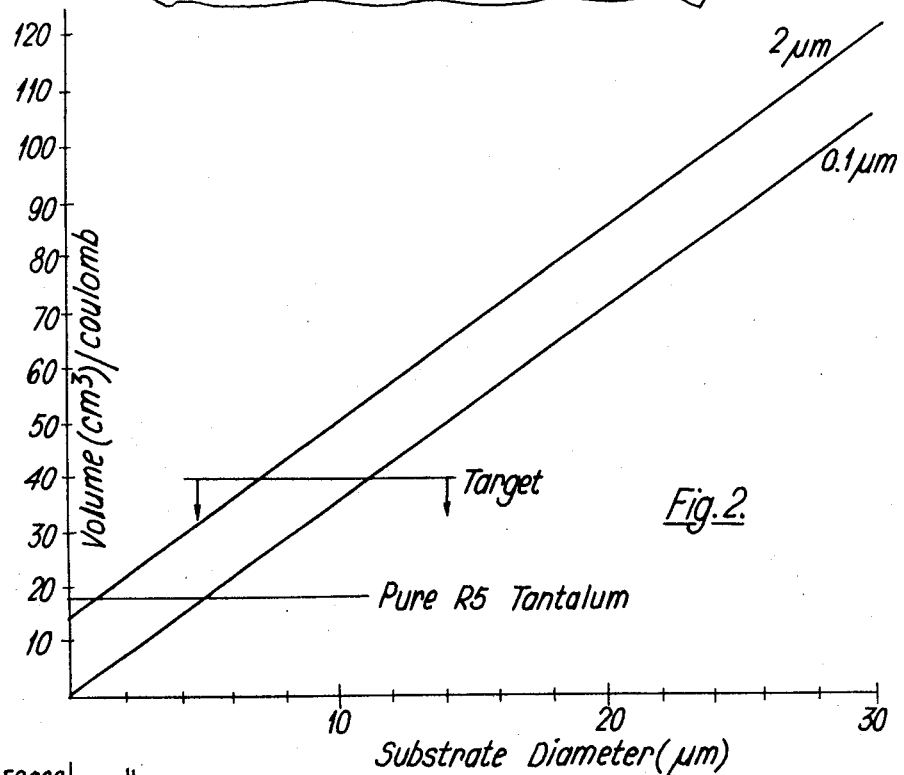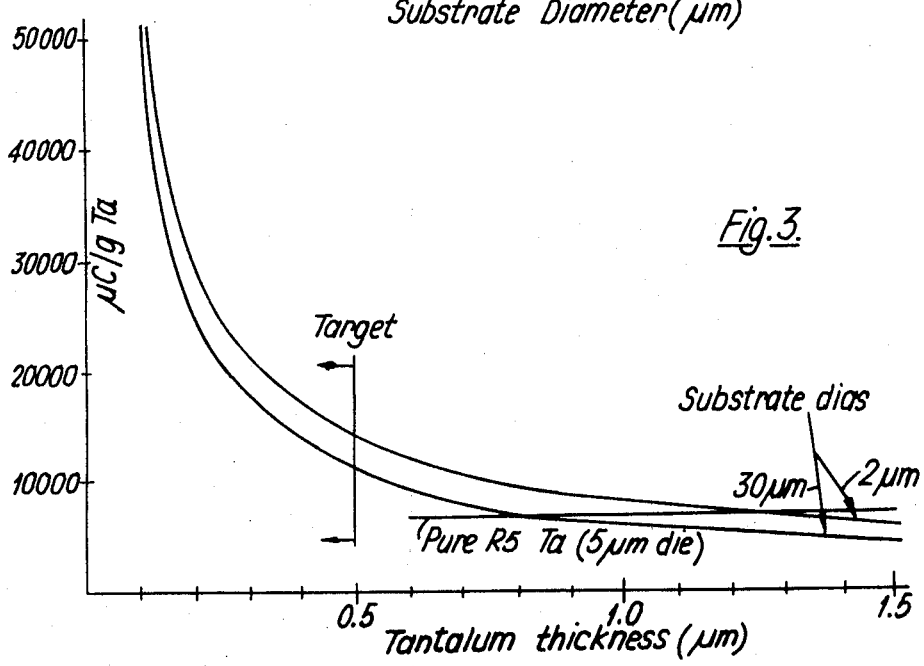

ANODE ELECTRODE FOR AN ELECTROLYTIC CAPACITOR

FIELD OF THE INVENTION

This invention relates to electrolytic capacitors, and particularly to the valve-metal electrode thereof.

BACKGROUND OF THE INVENTION

In the manufacture of tantalum capacitor anodes from powdered tantalum, part of the tantalum is used only as a contact and does not play an active part in the capacity forming mechanism. Tantalum, and other valve metals such as niobium and including alloys thereof such as niobium/tantalum alloys are expensive, and it is an object of the present invention to replace the non-contact valve metal with a less expensive material. One example of tantalum coated particles for use in electrolytic capacitors can be seen by reference to U.S. Pat. No. 3,708,728 incorporated herein by reference.

SUMMARY OF THE INVENTION

The invention provides an electrode for an electrolytic capacitor comprising a compacted, porous body of valve metal coated particles, wherein the particle cores are of a non-conducting, non-combustible material and wherein the initial thickness of the valve metal coating is such that upon anodization of the body at an anodizing voltage determined by the required voltage code of the capacitor the average thickness of the unanodized valve metal coating does not exceed 0.5 micron.

The invention also provides an electrode for an electrolytic capacitor comprising a compacted, porous, anodized body of valve metal coated particles, wherein the particle cores are of a non-conducting, non-combustible material, wherein the thickness of the anodized portion of the coating is determined by the required voltage code of the capacitor, and wherein the average thickness of the unanodized portion of the coating does not exceed 0.5 micron.

The provision of the valve metal coating on the particle cores is carried out by any suitable means, typically, for tantalum, by vapor phase reduction in hydrogen of tantalum pentachloride with the substrate particles on a fluidized bed.

Ceramic material, such as alumina, is suitable for the non-conducting, non-combustible particle core material. As will be described later, the particle core (substrate) size may range typically from 30μ down to 2.5μ.

Since the valve metal thickness remaining after anodization is limited to that necessary for anode contacting, the structure obtained offers the possibility of achieving a capacitor with self-healing breakdown characteristics. As a result of the reform process the thin layer of valve metal will be converted to oxide and effectively isolate the breakdown region. If this process can occur before oxide recrystallization then the tendency for the breakdown area to propagate throughout the capacitor will be reduced.

A further advantage when using tantalum, is that with the tantalum content the capacitor is significantly less combustible than conventional capacitors. Special flame retardant encapsulation is thus less important, apart from the need to prevent the encapsulant itself from burning.

Basic manufacturing steps in producing the capacitor anode involve providing valve metal coated particles of suitable substrate size according to the anode dimensions and valve metal coating thickness according to the required anodizing voltage, pressing and sintering the particles to form a compacted porous body, and anodizing the resulting body in accordance with the required operating voltage maximum of the capacitor, i.e. the voltage code of the capacitor.

Further steps for the production of an electrolytic capacitor from the anode body, i.e. provision of electrolyte (liquid or solid), cathode, lead attachment, housing and/or encapsulation are carried out in known manner.

The invention will be better understood from the following description taken in conjunction with the accompanying drawings, in which:

BRIEF DESCRIPTION OF THE DRAWINGS

FIG. 1 is a side view of a portion of a tantalum coated core or substrate,

FIG. 2 is a graph showing compact volume vs. substrate particle size,

FIG. 3 is a graph showing CV product/gram of tantalum vs. tantalum coating thickness.

DESCRIPTION OF THE PREFERRED EMBODIMENT

Figure 4:
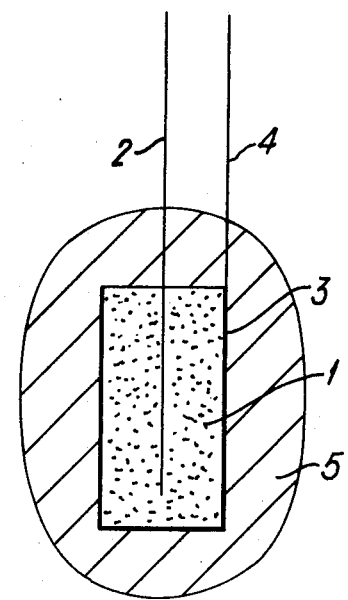
FIG. 4 is a sectioned view of an electrolytic capacitor embodying the invention.

The substrate core particles used within this invention are not spherical in shape, but are irregular. This gives the advantage of a larger surface area than with a sphere. Although the core particles are selected by being passed through a given mesh size, for the purposes of the later description their dimensions will be quoted in terms of radius or diameter as an indication of size.

As shown in FIG. 1, the tantalum coating 1 on a core 2 is not of uniform thickness, but may be considered as having an average thickness, as indicated by the dashed line 3, and it is this average thickness which is quoted subsequently. The compact volume product per gram metal for the capacitors of this invention is calculated in the following manner.

Density of tantalum ($d_{Ta}$): 2(gm/cc)
Density of tantalum pentoxide ($d_{Ta_2O_5}$): 8.2
Density of alumina ($d_{Al_2O_3}$): 3.97
Typical bulk density of tantalum compacts: ($d_B$) 9.4
Typical ratio ($\alpha$) of surface retained after sintering at 1450°: 0.57
Ratio $d_B \cdot d_{Ta}$ ($\beta$) typically 0.57 for R5 tantalum sintered at 1450° C
Dielectric strength of $Ta_2O_5$ 17A/volt equivalent to 8.5 A/volt of Ta.
Dielectric constant $Ta_2O_5$ 28
For pure tantalum powder (average particle size $2r$ cms)

$$\text{Surface/unit volume} = \frac{3\alpha\beta}{r} \text{ cm}^2$$

$$\text{Surface/unit weight } (g) = \frac{3\alpha}{16.6r} \text{ cm}^2$$

For a parallel plate capacitor, $$CV \text{ product} = \frac{0.0885 \times \text{dielectric constant}}{\text{dielectric strength}} \times 10^{-6} \mu C/cm^2$$

for tantalum, $CV$ product $= 14.5 \mu C/cm^2$ surface $$CV \text{ product/gram} = \frac{14.5 \times 3\alpha}{16.6r} \mu C$$

$$\text{And volume/10000 } \mu C = \frac{10000r}{14.5 \times 3\alpha\beta} \text{ cm}^3$$

For coated substrates, with
$t$ = thickness of tantalum coating
$d$ = density of substrate
$r_s$ = radius of substrate -continued $$\text{Surface/unit volume} = \frac{3\alpha\beta}{(r_s + t)} \text{ cm}^2 =$$

$$\frac{3(r_s + t)^2\alpha}{\{r_s^3 + 16.6[(r_s + t)^3 - r_s^3]\}} \text{ cm}^2$$

$$\text{Thus surface/gram tantalum} = \frac{3(r_s + t)^2\alpha}{16.6[(r_s + t)^3 - r_s^3]} \text{ cm}^2$$

$$CV \text{ product/gram tantalum} = \frac{14.5 \times 3(r_s + t)^2\alpha}{16.6[(r_s + t)^3 - r_s^3]} \mu C$$

$$\text{And volume/10000 } \mu C = \frac{10000(r_s + t)}{14.5 \times 3\alpha\beta} \text{ cm}^3$$

TABLE 1

| Substrate diameter ($\mu$) | Counting thickness ($\mu$) | CV product/ gram of tantalum | Volume/ 10 000$\mu$C (mm$^3$) | CV Product relative to T5 (5$\mu$dia) |
|---|---|---|---|---|
| 0 | 2.5 (ie 5$\mu$dia) | 6000 | 1.77 | 1 |
|  | 2 | 2807 | 12.03 | 0.47 |
|  | 1 | 5303 | 11.32 | 0.89 |
| 30 | 0.5 | 10285 | 10.97 | 1.72 |
|  | 0.25 | 20247 | 10.79 | 3.39 |
|  | 0.2 | 25227 | 10.75 | 4.22 |
|  | 0.1 | 50125 | 10.68 | 8.39 |
|  | 2 | 2954 | 8.49 | 0.49 |
|  | 1 | 5460 | 7.78 | 0.91 |
| 20 | 0.5 | 10447 | 7.43 | 1.75 |
|  | 0.25 | 20408 | 7.25 | 3.42 |
|  | 0.2 | 25387 | 7.22 | 4.25 |
|  | 0.1 | 50276 | 7.15 | 8.42 |
|  | 2 | 3357 | 4.95 | 0.56 |
|  | 1 | 5909 | 4.24 | 0.99 |
| 10 | 0.5 | 10921 | 3.89 | 1.83 |
|  | 0.25 | 20894 | 3.71 | 3.50 |
|  | 0.2 | 25880 | 3.68 | 4.33 |
|  | 0.1 | 50787 | 3.61 | 8.50 |
|  | 2 | 4006 | 3.18 | 0.67 |
|  | 1 | 6714 | 2.48 | 1.12 |
| 5 | 0.5 | 11817 | 2.12 | 1.98 |
|  | 0.25 | 21839 | 1.95 | 3.66 |
|  | 0.2 | 26831 | 1.91 | 4.49 |
|  | 0.1 | 51760 | 1.81 | 8.66 |
|  | 2 | 4873 | 2.30 | 0.32 |
|  | 1 | 8012 | 1.59 | 1.34 |
| 2.5 | 0.5 | 13430 | 1.24 | 2.25 |
|  | 0.25 | 23635 | 1.06 | 3.96 |
|  | 0.2 | 28670 | 1.03 | 4.80 |
|  | 0.1 | 53677 | 0.96 | 8.98 |
| 4 | 0.5 | 12243 | 1.77 | 2.05 |
| 4.6 | 0.2 | 26998 | 1.77 | 4.52 |
| 4.8 | 0.1 | 51840 | 1.77 | 8.68 |
| 4.9 | 0.05 | 101626 | 1.77 | 17.00 |

Table 1 shows the variation in tantalum material utilization and bulk volume of capacitor compacts with respect to substrate diameter and tantalum coating thickness. It can be seen from the value of CV product-/unit weight of tantalum that the substrate diameter has but little influence. The main factor in the efficient use of tantalum is the coating thickness. For instance, a 1$\mu$ thick layer of tantalum on 30 and 2.5$\mu$ diameter substrates yields respectively 5303 and 8012 $\mu$C/g tantalum. Thus, for over an order of magnitude reduction in substrate diameter there is only a 50% increase in available surface/g of tantalum.

The substrate particle size, however, directly affects the total volume occupied by the capacitor compact and the reduction from 30 to 2.5 microns decreases the volume/10000 $\mu$C from 11.32 to 1.59 mm$^3$ for a 1 micron tantalum coating. The effect is even more noticeable for thinner coatings of tantalum, e.g. 0.1$\mu$ on 30$\mu$ - 10.68 mm$^3$, 0.1$\mu$ on 2.5$\mu$ - 0.96 mm$^3$.

Thus it is possible to optimize, independently, capacitor compact size, compact volume vs. substrate particle size as shown in FIG. 2; and tantalum material utilization, CV/product gram tantalum vs. coating thickness as shown in FIG. 3.

If 5$\mu$ tantalum powder is taken as a standard for comparison then it may be seen that it is necessary to utilize a coating thickness of tantalum of less than 1$\mu$ to achieve a saving in tantalum material. The target thickness should be around 0.2$\mu$ which would provide at least a four fold reduction in the tantalum material. If a 10$\mu$ diameter substrate is employed then the volume/10000 $\times$ $\mu$C compared with 5$\mu$ tantalum is doubled, therefore, the linear increases in compact dimension will only be increased to $(2)^{1/3}$, that is 1.25 compared with about 1.85 for a 30$\mu$ diameter substrate.

A 0.2$\mu$ layer of tantalum should be able to be anodized up to 2000/8.5 volts, that is 235 volts before the layer is isolated by complete anodization. Experiments to date have shown that a nominal 0.1$\mu$ tantalum layer may be anodized to about 108 volts before the anode contact becomes an open circuit due to complete anodization. Thus a 0.2$\mu$ tantalum layer may be applicable for at least up to 35 volt code capacitors. The objective is of course to utilize the minimum thickness of tantalum for a given voltage code. This concept ensures the maximum utilization of tantalum material.

Table 2 shows the minimum required thickness of tantalum to provide the tantalum pentoxide dielectric at different voltage codes. If it is assumed that for anode contact purposes a thickness of tantalum of up to 500A is required then it is possible to design a coated powder for each voltage code. The thickness of the tantalum remaining after anodization in accordance with the desired voltage code in no instance will exceed 0.5$\mu$. For capacitors for entertainment use the size criteria is less critical than that for capacitors for professional use. At present a typical 1$\mu$F 35V entertainment use capacitor using T5/Ta powder (7000$\mu$C/g) employs an anode of dimensions 1.8 mm length and 1.5 mm diameter and weighing 20 mg.

If the anode of this capacitor were to become doubled in size it would not significantly cost any more to process, but it would have the advantage of being more easily handled.

In addition its application would not be affected by such a volume increase. Thus it is conceivable to utilize larger particle substrates and hence have the advantages of improved manageability.

TABLE 2

| Voltage Code | Anodizing Voltage | Dielectric thickness A | Total required Tantalum thickness ($\mu$) | CV product/ gram of Ta (substrate dia 10$\mu$) |
|---|---|---|---|---|
| 3 | 20 | 170 | 0.035 | 143248 |
| 6 | 30 | 255 | 0.045 | 111635 |
| 15 | 70–80 | 680 | 0.075 | 67376 |
| 20 | 80–90 | 765 | 0.095 | 53400 |
| 35 | 140 | 1190 | 0.14 | 36550 |
| 50 | 200 | 1700 | 0.19 | 27188 |
| 75 | 300 | 2550 | 0.28 | 19759 |

FIG. 4 shows an electrolytic capacitor having an anode 1 of a compacted, porous, anodized body of valve metal, e.g. Ta, coated particles, the particle cores being of a non-conducting, non-combustible material such as alumina. The thickness of the valve metal coating after anodization is sufficient to ensure anode contacting. This thickness ranges from about 10 A to 2,000 A so that it is possible to have, initially, a powder of valve metal coated particles of the non-conducting, non-combustible material, wherein the thickness of the valve metal coating does not exceed 0.5μ, and upon compaction and subsequent anodizing according to the required voltage code of the capacitor, an anode contacting layer of valve metal remains within the range of thickness mentioned above.

The capacitor further comprises an anode lead 2 inserted into the coated powder before compaction thereof. The cathode comprises a casing 3 from which extends a cathode lead 4, and an overall encapsulation 5.

Breakdown evaluation tests have been carried out on a batch of capacitors with the embodiment of FIG. 4 having an anode consisting of tantalum coated alumina particles with a measured performance superior to that of conventional all-tantalum capacitors.

With the anode of tantalum coated alumina, the breakdown process is non-destructive, and the failure mode is open circuit (as opposited to short circuit for all-tantalum capacitors) and the number of breakdowns that could be tolerated is increased by at least two orders of magnitude.

With 15V capacitors in accordance with the present invention under test with a series resistance of 500 ohms and an applied voltage of 60v, an "open circuit" condition occurred after some 70,000 to 80,000 breakdowns. It seems likely that the heat generated by a breakdown destroys the bridges of tantalum between several particles around the breakdown region, isolating them from the rest of the capacitor. The term "open circuit" is used to indicate a condition which is actually a resistance state of $\geq 10^8$ ohms at 15 v D.C. with an associated capacitance of a few hundred picofarads.

Under the same testing conditions, a group of conventional, all-tantalum capacitors survived an average of 230 breakdowns before reaching a terminal short circuit mode.

It is to be understood that the foregoing description of specific examples of this invention is made by way of example only and is not to be considered as a limitation on its scope.

What is claimed is:

1. An electrode for an electrolytic capacitor, said electrode having a body portion comprising:
a compacted porous body of valve metal coated particles; said particles each having a core consisting of an electrically non-conducting non-combustible material; and a coating of valve metal on each said core, said coating having an anodized portion and an unanodized portion, the thickness of said unanodized portion not exceeding 0.5 microns.

2. The electrode of claim 1 wherein the thickness of the anodized portion of said coating determines the breakdown voltage for the capacitor.

3. The electrode of claim 1 wherein said core comprises alumina.

4. The electrode of claim 1 wherein the core size ranges from 2.5 to 30 microns.

5. The electrode of claim 1 wherein the valve metal is selected from the group consisting of tantalum and niobium.

6. The electrode of claim 1 wherein the thickness of said unanodized valve metal portion does not exceed 500 angstroms.

7. The electrode of claim 1 wherein the thickness of said coating is 0.2 microns.

* * * * *